United States Patent
Mills et al.

(10) Patent No.: US 9,587,331 B2
(45) Date of Patent: Mar. 7, 2017

(54) METHOD FOR CURING OF GREEN POLYSILAZANE-BASED SILICON CARBIDE PRECURSOR FIBERS

(71) Applicant: GENERAL ELECTRIC COMPANY, Schenectady, NY (US)

(72) Inventors: Ryan Christopher Mills, Rexford, NY (US); Peter Kennedy Davis, Niskayuna, NY (US); Matthew Hal Littlejohn, Clifton Park, NY (US); Slawomir Rubinsztajn, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 426 days.

(21) Appl. No.: 14/193,158

(22) Filed: Feb. 28, 2014

(65) Prior Publication Data
US 2015/0247265 A1    Sep. 3, 2015

(51) Int. Cl.
| | |
|---|---|
| *D01F 11/08* | (2006.01) |
| *C04B 35/571* | (2006.01) |
| *C04B 35/622* | (2006.01) |
| *C04B 35/626* | (2006.01) |
| *C04B 35/628* | (2006.01) |
| *C08G 77/62* | (2006.01) |
| *D01F 9/10* | (2006.01) |
| *C08J 3/24* | (2006.01) |
| *D01D 10/02* | (2006.01) |
| *D01F 6/94* | (2006.01) |

(52) U.S. Cl.
CPC ............ *D01F 11/08* (2013.01); *C04B 35/571* (2013.01); *C04B 35/6269* (2013.01); *C04B 35/62281* (2013.01); *C04B 35/62844* (2013.01); *C08G 77/62* (2013.01); *C08J 3/243* (2013.01); *D01D 10/02* (2013.01); *D01F 6/94* (2013.01); *D01F 9/10* (2013.01); *C04B 2235/444* (2013.01); *C04B 2235/483* (2013.01); *C04B 2235/5264* (2013.01); *C04B 2235/666* (2013.01); *C08J 2383/16* (2013.01); *D10B 2331/30* (2013.01)

(58) Field of Classification Search
None
See application file for complete search history.

(56) References Cited

U.S. PATENT DOCUMENTS

| | | | |
|---|---|---|---|
| 3,098,830 A | 7/1963 | Rochow | |
| 4,631,260 A | 12/1986 | Bartos et al. | |
| 4,722,988 A * | 2/1988 | Porte | C04B 35/589 522/148 |
| 4,929,704 A | 5/1990 | Schwark | |

(Continued)

FOREIGN PATENT DOCUMENTS

WO    2014193545 A1    12/2014

OTHER PUBLICATIONS

PCT Search Report and Written Opinion from corresponding PCT Application No. PCT/US2015/016768 dated Apr. 30, 2015.

*Primary Examiner* — Robert S Loewe
(74) *Attorney, Agent, or Firm* — John P. Darling (57) ABSTRACT

Disclosed herein are methods of curing silicon carbide precursor polymer fibers, such as polysilazanes, using moisture and free radical generators, such as peroxides. Also disclosed are methods of forming, curing, and using silicon carbide precursor polymers that contain alkenyl groups and free radical generators, such as peroxides.

12 Claims, 3 Drawing Sheets

(56) References Cited

U.S. PATENT DOCUMENTS

| | | | |
|---|---|---|---|
| 4,942,011 | A | 7/1990 | Bolt et al. |
| 4,997,601 | A | 3/1991 | Mininni et al. |
| 5,021,533 | A | 6/1991 | Schwark |
| 5,032,649 | A | 7/1991 | Schwark |
| 5,155,181 | A | 10/1992 | Schwark |
| 5,171,722 | A | 12/1992 | Toreki et al. |
| 5,223,461 | A | 6/1993 | Riccitiello et al. |
| 5,268,336 | A | 12/1993 | Deleeuw et al. |
| 5,278,110 | A | 1/1994 | Toreki et al. |
| 5,851,942 | A * | 12/1998 | Sacks .............. C04B 35/571 264/DIG. 19 |
| 2009/0001219 | A1 * | 1/2009 | Golecki ............ B29C 70/48 244/133 |
| 2011/0212329 | A1 | 9/2011 | Pope et al. |
| 2012/0237765 | A1 | 9/2012 | Pope et al. |

* cited by examiner

METHOD FOR CURING OF GREEN POLYSILAZANE-BASED SILICON CARBIDE PRECURSOR FIBERS

BACKGROUND OF THE INVENTION

Technical Field

The present invention generally relates to methods of forming silicon carbide fibers. In some specific embodiments, the present disclosure relates to methods of forming, curing, and using polysilazane resins.

Background Information

Polysilazane green fibers are precursors to silicon carbide (SiC) fibers. These green fibers must be cross-linked to make them infusible so that the fiber's dimensional integrity is maintained during subsequent pyrolysis steps. The current commercially viable crosslinking process of green fibers involves exposure of a package of polycarbosilane or polysilazane green fibers to high energy e-beam radiation. However, the high energy e-beam system is prohibitively expensive due to the large capital investment. Further, the currently practiced irradiation process takes several hours due to the requirement that the temperature of irradiated fibers not reach the melting point of polysilazane resin, wherein they would melt and become deformed. The required large e-beam dose, therefore, must be delivered at a slow rate and must take enough time to cool down before returning to the e-beam for another small dose, until such time as the package is effectively cross-linked.

Other prior art methods of making polysilazane green fibers infusible involve exposure of the fibers to moisture, which provides a cross-linked fiber with high level of oxygen. Some approaches involve the addition of a free-radical generator to a pre-ceramic polymer in an inert (that is, moisture- and air-free) atmosphere. Some specially formulated polysilazane green fibers may also be cross-linked by UV irradiation. Other methods involve exposing the green fibers to reactive and toxic gases such as ammonia, $BCl_3$ or $HSiCl_3$. Such processes present several environmental health and safety challenges and are expensive due to the toxic nature of the reagents.

Some prior art methods of forming silicon carbide structures are not conducive to forming silicon carbon fibers. For instance, in some cases, films are formed, rather than fibers. In these instances, melting of the polymeric structures is not only acceptable, but is often desired; this would be the case for films. Fibers, however, must be prevented from melting so that the desired shape is maintained. Thus, a need exists for a safe, inexpensive method for making silicon carbide fibers that do not become deformed during cure and production.

SUMMARY OF THE INVENTION

This invention provides a low cost method for crosslinking (curing) polymeric precursors for silicon carbide fiber by utilizing a combination of both moisture and thermally activated cure processes. Independently, these processes are not sufficient to effectively cure the precursor fibers, but in combination, and with the appropriate chemical and process design, the cure is robust.

The present invention provides, in a first aspect, a method for curing a polysilazane fiber. This method includes forming a polysilazane fiber by reacting at least one methylchlorodisilane, at least one organochlorosilane comprising at least one alkenyl group, and at least one nitrogen-containing additive to form a resin. This resin is combined with at least one free-radical generator and optionally at least one inhibitor to form a resin mixture. A polysilazane fiber is formed by spinning the resin mixture. The spinning step is performed at a temperature below the 1 hour half-life temperature of the free radical generator. The polysilazane fiber is then exposed to moisture and is cured by exposing it to a temperature at or above the 1 hour half-life temperature of the free radical but below the softening point temperature of the moisture-exposed polysilazane fiber.

The present invention provides, in a second aspect, a method for curing a polysilazane fiber. The method includes exposing a polysilazane fiber that contains a) at least one alkenyl group and b) a free radical generator to moisture, and curing the polysilazane fiber by exposing it to a temperature above the 1 hour half-life temperature of the free radical generator but below the softening point temperature of the moisture-exposed polysilazane fiber.

The present invention provides, in a third aspect, a method of preparing a silicon carbide fiber. The method includes forming a polydisilazane resin by reacting at least one methylchlorodisilane (MCDS); at least one organochlorosilane comprising at least one alkenyl group; and at least one nitrogen-containing additive to form a resin. This resin is combined with at least one free-radical generator and optionally at least one inhibitor to form a resin mixture. Spinning of the resin mixture is performed to form a polysilazane fiber; the spinning is performed at a temperature below the 1 hour half-life temperature of the free radical generator. The polysilazane fiber is then exposed to moisture, and is cured by exposing the moisture-exposed polysilazane fiber to a temperature at or above the 1 hour half-life temperature of the free radical but below the softening point temperature of the moisture-exposed polysilazane fiber. The cured polysilazane fiber is then heated to form a silicon carbide fiber.

Since the residence time in typical spinning equipment can be up to 1 hour, a significant amount of free radicals can be generated in the spinning step. If desired, a free radical inhibitor can be introduced into the resin to consume these radicals, preventing them from curing the polymer in the spinning equipment.

These and other objects, features and advantages of this invention will become apparent from the following detailed description of the various aspects of the invention taken in conjunction with the accompanying drawings.

DETAILED DESCRIPTION OF THE INVENTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified.

In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Disclosed herein is a controllable, moisture-inclusive process for crosslinking polysilazane green fibers containing at least one unsaturated functional group which is reactive in the presence of free radicals. A moisture treatment step is included in this process. The inherent moisture reactivity of the polysilazane polymer is used to increase the softening point temperature ($T_{sf}$) of the fiber, and this increase in $T_{sf}$ allows the fiber to be heated to the 1 hr half-life temperature of an incorporated free-radical generator without melting, sticking, and/or deforming prior to substantial conversion of alkenyl groups. This results in increased cross-linking of the fiber, strengthening it so that its shape is preserved in subsequent pyrolysis and processing steps. The disclosed process eliminates the need for expensive e-beam facilities, resulting in low required capital investment. The commercial process would utilize inexpensive ovens to facilitate moisture and thermal cure of the fibers, resulting in a significant cost reduction versus traditional e-beam cure.

Figure 1:
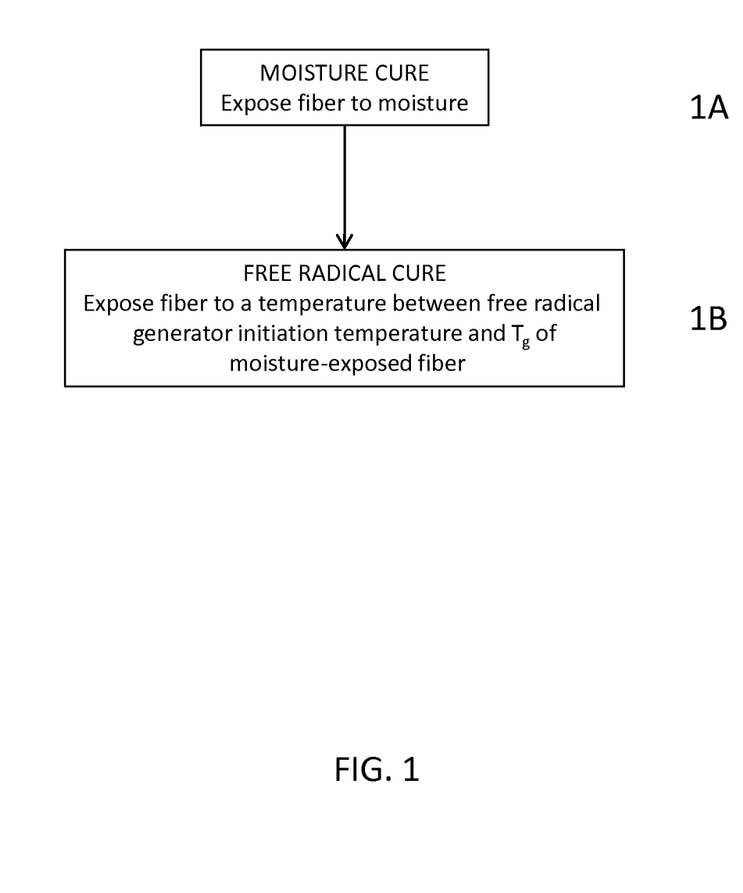
FIG. 1 depicts a process of curing a polysilazane fiber by one embodiment of the invention.

The present invention provides, in one aspect, a method for curing a polysilazane fiber that is already formed. One such embodiment is illustrated in FIG. 1. The method includes exposing a polysilazane fiber that contains a) at least one alkenyl group and b) a free radical generator to moisture 1A, and curing the polysilazane fiber by exposing it to a temperature above the 1 hr half-life temperature of the free radical generator but below the softening point temperature of the moisture-exposed polysilazane fiber 1B.

The moisture cure converts at least a portion of the silazane to siloxane in the polymer fiber by hydrolysis/condensation processes. One illustration of this is shown in the reaction below:

resin. As can be seen above, ammonia is the by-product of this process. The hydrolysis/condensation process allows for the softening point temperature of the fiber to be increased, as discussed more fully below.

The present invention provides, in one aspect, a method for forming and curing a polysilazane fiber. One such embodiment is described in FIG. 2. First, a resin is formed by reacting at least one methylchlorodisilane; at least one organochlorosilane comprising at least one alkenyl group; and at least one nitrogen-containing additive 2A.

In some embodiments, the methylchlorodisilane is 1,2-dichloro-1,1,2,2-tetramethyldisilane. In some embodiments, the methylchlorodisilane is 1,1,2-trichloro-1,2,2-trimethyldisilane. In some embodiments, the methylchlorodisilane is 1,1,2,2-tetrachloro-1,2-dimethyldisilane. In some embodiments, the methylchlorodisilane may be a mixture of one or more methylchlorodisilanes listed above.

Examples of alkenyl groups include but are not limited to vinyl, allyl, acrylate, methacrylate, vinylether, or styryl. In some embodiments, the alkenyl group is vinyl. Alkynyl groups would also be suitable for these applications. In some embodiments, the organochlorosilane comprising at least one alkenyl group is of formula In some embodiments, $R^a$ is selected from hydrogen, $(C_1-C_{12})$alkyl, phenyl, vinyl, allyl or a combination thereof. In some embodiments, $R^a$ is selected from $(C_1-C_4)$alkyl, phenyl, vinyl, allyl, acrylate, methylacrylate, and vinylbenzyl.

In some embodiments, $R^b$ is selected from chlorine, hydrogen, $(C_1-C_{12})$alkyl, phenyl, vinyl, allyl or a combination thereof. In some embodiments, $R^b$ is selected from chloro, $(C_1-C_4)$alkyl, phenyl, vinyl, allyl, acrylate, methylacrylate, and vinylbenzyl.

In some embodiments, the concentration of olefin in the polydisilazane resin is greater than 1 mol/kg. In some embodiments, the concentration of olefin in the polydisilazane resin is between 1 mol/kg and 6 mol/kg. In some embodiments, the concentration of olefin in the polydisilazane resin is between 2 mol/kg and 5 mol/kg. In some The hydrolysis of the —NHSiMe$_3$ end groups and their subsequent condensation leads to the crosslinking of the embodiments, the concentration of olefin in the polydisilazane resin is between 1 mol/kg and 3 mol/kg. In some embodiments, the concentration of olefin in the polydisilazane resin is between 1 mol/kg and 2 mol/kg. In some embodiments, the concentration of olefin in the polydisilazane resin is between 2 mol/kg and 5 mol/kg. In some embodiments, the concentration of olefin in the polydisilazane resin is between 2 mol/kg and 4 mol/kg. In some embodiments, the concentration of olefin is between 1.5 and 3.5 wt %. In some embodiments, the concentration of olefin is between 2 and 3 wt %. In some embodiments, the concentration of olefin is between 1.5 and 2.5 wt %. In some embodiments, the concentration of olefin is between 2.5 and 3.5 wt %. An olefin, for purposes of this disclosure, includes a moiety containing at least one carbon-to-carbon double-bond. Moieties containing at least one carbon-to-carbon triple bond may also be used for purposes of this disclosure. Mixtures of organochlorosilanes may be present in some embodiments.

In some embodiments, the nitrogen-containing additive is selected from hexamethyldisilazane, tetramethyldisilazane, divinyltetramethyldisilazane, methylamine, and ammonia.

Figure 2:
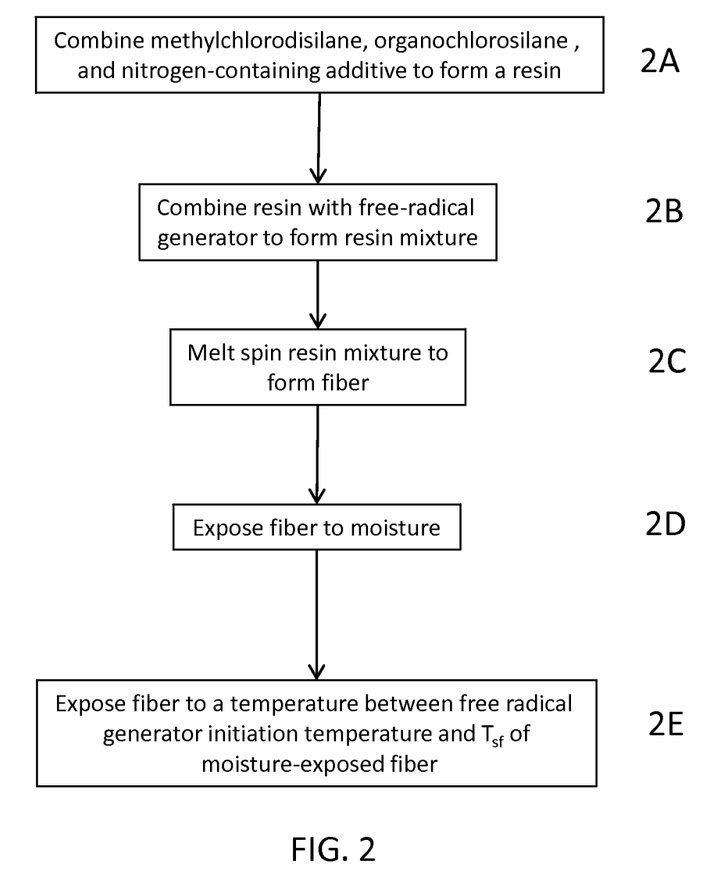
FIG. 2 depicts a process of forming and curing a polysilazane fiber by one embodiment of the invention.

After the polysilazane resin is formed, it is combined with the required amount of free radical generator to form a resin mixture 2B.

An adequate quantity of the free-radical generator should be added to sufficiently crosslink the polymer. In some embodiments, the concentration of free-radical generator is between 0.1 and 5 wt %. In some embodiments, the concentration of free-radical generator is between 0.1 and 2 wt %. In some embodiments, the concentration of free-radical generator is between 0.1 and 1 wt %. In some embodiments, the concentration of free-radical generator is between 0.5 and 1 wt %. In some embodiments, the concentration of free-radical generator is between 0.5 and 0.8 wt %. In some embodiments, the concentration of free-radical generator is between 0.25 and 0.75 wt %. In some embodiments, the concentration of free-radical generator is between 0.6 and 0.8 wt %. In some embodiments, the concentration of free-radical generator is between 0.75 and 1 wt %.

Free-radical generators that generate reactive radicals capable of initiating the polymerization of alkenyl groups and that are compatible with the fiber spinning process may be used. In some embodiments, the free-radical generator is selected from a peroxide, a peroxycarbonate, a peroxysiloxane, and an azo-containing compound. In some embodiments, the free-radical generator is selected from a diaroyl peroxide, a dialkyl peroxide, a diaralkyl peroxide, an alkyl aralkyl peroxide, an alkylaroyl peroxide, and an alkylacyl peroxide. In some embodiments, the free-radical generator is selected from dibenzoyl peroxide, t-benzoyl peroxide, di-p-chlorobenzoyl peroxide, di(2,4-dichlorobenzoyl) peroxide, 2,5-dimethyl-2,5-di(t-butylperoxy)hexane, di-tert-butyl peroxide, dicumyl peroxide, t-butyl cumyl peroxide, cumyl-t-butyl peroxide, 1,4-bis(t-butylperoxyisopropyl)benzene, t-butyl peracetate, t-butyl peroctoate, t-butylperoxy isopropyl carbonate, 2,2'-azobis(2-methylpropionitrile), 2,2'-azobis(2,4-dimethyl-4-methoxyvaleronitrile), 1-cyano-1-(t-butylazo)cyclohexane; 2-(t-butylazo)isobutyronitrile, tert-butyl peroxypivalate, dilauroyl peroxide, tert-butyl peroxy-2-ethylhexanoate, 1,1-di-(t-butylperoxy)cyclohexane, 1,1-di(tert-butylperoxy)-3,3,5-trimethylcyclohexane, di(tert-butylperoxy)cyclohexane, tert-butyl peroxy-3,5,5-trimethylhexanoate, tert-butyl peroxyacetate, tert-butyl peroxybenzoate, di-tert-amyl peroxide, dicumyl peroxide, di(tert-butylperoxyisopropyl)benzene, 2,5-dimethyl-2,5-di(tert-butylperoxy)hexane, tert-butyl peroxyacetate, di-tert-amyl peroxide, cumyl hydroperoxide, dicumyl peroxide, di(tert-butyl-peroxyisopropyl)benzene, 2,5-dimethyl-2,5-di(tert-butylperoxy)hexane, tert-butyl cumyl peroxide, 2,5-dimethyl-2,5-di(tert-butylperoxy)hexyne-3. In some embodiments, the free-radical generator is selected from dicumylperoxide.

In some embodiments, the optional inhibitor is selected from 2,6-di-tert-alkyl-4-methylphenols, N-(1,4-dimethylpentyl)-N-phenyl-p-phenylenediamine, 4-tert-butyl-1,2-dihydroxy benzene. In some embodiments, the inhibitor is 2,6-di-tert-butyl-4-methylphenol (BHT). In some embodiments, the molar ratio of free-radical generator to inhibitor is between 0.3 to 3. In some embodiments, the molar ratio of free-radical generator to inhibitor is 0.3:2. In some embodiments, the molar ratio of free-radical generator to inhibitor is 1:3. In some embodiments, the molar ratio of free-radical generator to inhibitor is 0.5:1.5. In some embodiments, the molar ratio of free-radical generator to inhibitor is 0.5:1. In some embodiments, the molar ratio of free-radical generator to inhibitor is 1:1.5. In some embodiments, the molar ratio of free-radical generator to inhibitor is 0.75:1.25. In some embodiments, the molar ratio of free-radical generator to inhibitor is 1:1. In some embodiments, the molar ratio of free-radical generator to inhibitor is 1:1 and the concentration of free-radical generator is 0.75-1 wt %. In some embodiments, the molar ratio of free-radical generator to inhibitor is 1:1 and the free-radical generator is dicumyl peroxide at a concentration of 0.75-1 wt %.

Other additives, for example, sintering agents, such as boron and boron-containing compounds, may optionally be added. For instance, a boron-containing compound such as $BCl_3$ may be added; while this compound is not required to facilitate the cure process that this disclosure is drawn to, its presence is often desirable in later stages of the fiber-making process in order to increase the quality of the resulting fiber.

In some embodiments, the polysilazane is polydisilazane.

The resin mixture is subjected to spinning in order to form a polysilazane fiber 2C. In some embodiments, the spinning is melt spinning. The spinning is performed at a temperature below the 1 hr half-life temperature of the free radical generator. The "1 hr half-life temperature", for purposes of this disclosure, means the temperature at which 50% of the free radical molecules undergo decomposition to form free radicals in one hour. The temperature used depends upon the rate of decomposition of the specific free radical generator. In some embodiments, the spinning temperature is between 80° C. and 250° C. In some embodiments, the spinning temperature is between 100° C. and 200° C. In some embodiments, the spinning temperature is between 110° C. and 150° C. For instance, if dicumyl peroxide is used, the spinning temperature may be below 130° C. If one (or more) inhibitors is present, the spinning temperature may be higher than the 1 hr half life temperature of the free radical generator absent such initiator(s); in these instances, it may be possible to increase the spinning temperature to above the non-inhibited 1 hr half life temperature of the free radical generator.

The free-radical generator may be incorporated into the polysilazane fiber in a number of different ways. In some embodiments, the free-radical generator may be mixed into the polymer before the spinning step. In another embodiment, if the 1 hour half-life temperature of the free-radical generator is appropriately low, it may be introduced into the polymer during the spinning step. In still other embodiments, the free-radical generator is heated to generate a vapor, and this vapor may be infused into the fiber either during the spinning step or during the moisture cure step.

Once the polysilazane fiber has been formed by spinning, a moisture cure of the fiber is performed 2D. The fiber is exposed to moisture. The moisture cure step should be done under conditions that mitigate oxidation of the fiber. In some embodiments, the moisture cure is performed in an inert atmosphere, such as $N_2$, argon or helium. In other embodiments, the moisture cure is done in air. By exposing the fiber to moisture, the polymer end groups are hydrolyzed and subsequently condensed. This moisture cure increases the softening point temperature ($T_{sf}$) of the polymer. $T_{sf}$ is the critical temperature at which the polysilazane fibers begin to stick to each other. In some embodiments, the moisture cure is performed at a temperature between 20° C. and 250° C. In some embodiments, the moisture cure is performed at a temperature between 25° C. and 150° C. In some embodiments, the moisture cure is performed at a temperature between 35° C. and 75° C. In some embodiments, the moisture cure is performed at a temperature between 35° C. and 50° C. In some embodiments, the moisture cure is performed at a temperature between 20° C. and 50° C. Moisture may be added first at low temperature (e.g., less than 60° C.); moisture may also be added at higher temperatures, but these high temperatures are not necessary for cure. In some embodiments, the moisture cure is performed at greater than 1% relative humidity. In some embodiments, the moisture cure is performed at greater than 10% relative humidity. In some embodiments, the moisture cure is performed at greater than 50% relative humidity. In some embodiments, the moisture cure is performed at greater than 90% relative humidity. In some embodiments, the moisture cure is performed at between 1% and 75% relative humidity. In some embodiments, the moisture cure is performed at between 10% and 60% relative humidity. In some embodiments, the moisture cure is performed at between 40% and 75% relative humidity. In some embodiments, the moisture cure is performed at between 40% and 60% relative humidity. In some embodiments, the moisture cure is performed at between 50% and 100% relative humidity. In some embodiments, the moisture cure is performed at between 60% and 75% relative humidity. The moisture exposure step may be followed by an exposure to a dry nitrogen or vacuum step at elevated temperature to facilitate the condensation reaction.

Because the moisture cure step increases the $T_{sf}$ of the polysilazane polymer structure, the polysilazane fiber may be heated to (or above) the 1 hr half-life free radical generator temperature after the moisture cure. The initiation of the free radical generator consumes alkenyl groups in the polymer in order to increase branching and crosslinking. The temperature of the free-radical generator cure step 2E will be between the 1 hr half-life temperature of the free radical and the softening point temperature of the moisture-exposed polysilazane fiber. In some embodiments, the temperature of the free-radical generator cure step will be between 140-250° C. In some embodiments, the temperature of the free-radical generator cure step will be between 150-225° C. In some embodiments, the temperature of the free-radical generator cure step will be between 160-200° C. In some embodiments, the temperature of the free-radical generator cure step will be between 180-220° C.

Figure 3:
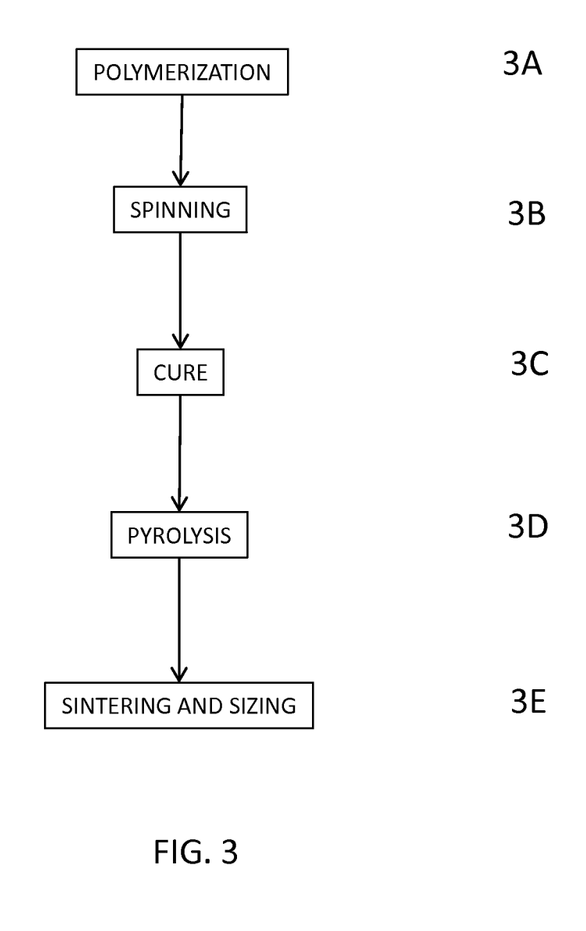
FIG. 3 depicts a process of forming a silicon carbide fiber by one embodiment of the invention.

FIG. 3 shows a method of forming a silicon carbide fiber utilizing an embodiment of the invention. A resin is formed by polymerization 3A that includes at least one methylchlorodisilane, at least one organochlorosilane that contains at least one alkenyl group, and at least one nitrogen-containing additive. As described above, at least one free-radical generator may be included in this step or may be added later. One or more inhibitors and/or sintering agents may also be included in the resin. The polymerized resin is then spun into fibers by spinning, for instance, by melt spinning 3B. The length and diameter of the fibers can be tailored as necessary to the desired use. In some non-limiting embodiments, for instance, the fiber diameter may be between 18 and 50 microns. In one embodiment, the melt spinning step utilizes an extruder and a spinneret, however, any method of forming such a fiber would be appropriate. Next, the fiber is exposed to moisture and then to a temperature above the free radical generator 1 hr half-life temperature and below the $T_{sf}$ of the moisture-exposed fiber 3C in order to cure, as described more fully above. The cured fiber may then be pyrolyzed at a temperature of between 800° C. and 1400° C. to form an amorphous SiNCO fiber 3D. In some embodiments, the cured fiber is pyrolyzed at a temperature of between 1000° C. and 1250° C. In some embodiments, the cured fiber is pyrolyzed at a temperature of about 1200° C. The pyrolyzed fiber (amorphous SiCNO fiber) may then be sized. The sized fiber is then subjected to heat treatment in an inert gaseous atmosphere in a temperature range from 1400° C. to 2000° C. 3E. In some embodiments, the heat treatment may be performed under tension at 1800-1900° C. This heat treatment converts the amorphous SiCNO fiber into a dense crystalline silicon carbide fiber. The fiber may optionally be sized again and the finished silicon carbide fiber may then be packaged and shipped.

Examples

Synthesis of Polydisilazane Resin

A mixture of chloromethyldisilanes, phenyltrichlorosilane, vinyltrichlorosilane, and $BCl_3$ as 1-molar solution in heptane were charged (Table 1) to 1 L, 3-neck round bottomed flask equipped with mechanical stirrer, Dean-Stark trap with condenser, thermocouple, and addition funnel under atmosphere of dry nitrogen. Subsequently, the desired amount of a mixture of HMDS was added quickly via an addition funnel to complex free $BCl_3$. A small exotherm about 5° C. was observed at that point, and a small amount of white precipitate was formed. The obtained reaction mixture was slowly heated to 75° C. A drop-wise addition of the remaining HMDS started when the reaction temperature reached 75° C. The temperature of the reaction mixture was slowly increased to 100° C. during the addition of HMDS. Heptane and trimethylchlorosilane, the volatile by-products of the reaction of HMDS with chlorosilanes, were removed progressively by a simple distillation as HMDS was added. A significant amount of white precipitate, which was identified as ammonium chloride, was formed at these conditions. The temperature of reaction was raised to 135° C. when addition of HMDS was completed and held at this temperature for 1 hr. Subsequently, the reaction mixture was refluxed at 150° C. for 3 hrs. Ammonium chloride suspended in the reaction mixture sublimed at those conditions yielding a clear reaction mixture after about 1 hr. of reflux. The clarified reaction mixture after 3 hrs. of reflux at 150° C. was slowly heated to 180° C. The reaction mixture was cooled after about 4 hrs. of holding at 180° C. The solid polymer was removed from the flask and ground into powder in a dry box. The above polydisilazane resins were blended with desired amounts of free-radical generator and inhibitor (Table 2) and subsequently melt-spun between 118 and 135° C. to form a tow of 48 fibers with a diameter about 26 um (Table 2). The obtained fibers were exposed to moisture at 25 C and 50% relative humidity and subsequently heat treated in dry nitrogen atmosphere or under vacuum. In some cases, the heat-treated fibers were additionally exposed to higher temperature water vapor (steam) to promote further hydrolysis and crosslinking (Table 2). In the steam step, the partial pressure of water vapor was controlled by metering water and nitrogen into the oven's atmosphere. Subsequently, the crosslinked fibers were pyrolyzed in pure nitrogen at 1100° C. to yield black ceramic fibers as presented in Table 3.

TABLE 1

Formulations used to preparation of resin

| Resin Name | MCDS (g) | 1M BCl$_3$ (g) | PhSiCl$_3$ (g) | PhViSiCl$_2$ (g) | ViMeCl$_2$Si (g) | ViCl$_3$Si (g) | HMDS (g) |
|---|---|---|---|---|---|---|---|
| Resin 1 | 345 | 74 | 54 | 98 | 0 | 77 | 786 |
| Resin 2 | 350 | 204 | 54 | 0 | 68 | 77 | 972 |
| Resin 3 | 253 | 148 | 125 | 0 | 0 | 112 | 860 |
| Resin 4 | 169 | 148 | 83 | 0 | 0 | 75 | 594 |

TABLE 2

| Resin Name | 0.75 wt % of Free Radicals Generator | Inhibitor* | Fiber Spinning Temperature (° C.) | Moisture Cure Protocol | Thermal Cure Protocol | Steam Protocol |
|---|---|---|---|---|---|---|
| Resin 1a | DCP | BHT | 130 | 24 hrs @ 50% RH, 25 C. | 200 C., 20 hrs, dry N2 | None |
| Resin 1b | DCP | BHT | 130 | 24 hrs @ 50% RH, 25 C. | 200 C., 18 hrs, vacuum | None |
| Resin 1c | None | None | 130 | 24 hrs @ 50% RH, 25 C. | 200 C., 24 hrs, vacuum | None |
| Resin 2a | DCP | BHT | 125 | 6 hrs @ 50% RH, 25 C. | None | None |
| Resin 2b | DCP | BHT | 125 | 24 hrs @ 50% RH, 25 C. | None | None |
| Resin 2c | DCP | BHT | 125 | 24 hrs @ 50% RH, 25 C. | 25 C., 3 hrs, vacuum | None |
| Resin 2d | DCP | BHT | 125 | 24 hrs @ 50% RH, 25 C. | None | 12 hrs @ 180 C., P_H2O = 0.9 bar |
| Resin 2e | DCP | BHT | 125 | 24 hrs @ 50% RH, 25 C. | 200 C., 24 hrs, vacuum | 12 hrs @ 180 C., P_H2O = 0.9 bar |
| Resin 2f | DTBP | BHT | 120 | 24 hrs @ 50% RH, 25 C. | None | None |
| Resin 3a | DCP | BHT | 118 | 24 hrs @ 50% RH, 25 C. | None | None |
| Resin 3b | DCP | BHT | 118 | 24 hrs @ 50% RH, 25 C. | None | 16 hrs @ 180 C., P_H2O = 0.9 bar |
| Resin 4a | DCP | BHT | 135 | 24 hrs @ 50% RH, 25 C. | None | 16 hrs @ 180 C., P_H2O = 0.9 bar |
| Resin 4b | DCP | BHT | 135 | 24 hrs @ 50% RH, 25 C. | None | 16 hrs @ 180 C., P_H2O = 0.9 bar |

*The mol ratio of inhibitor to free radical generator is 1:1

TABLE 3

| Resin Name | Comments: Fiber are loose or fused |
|---|---|
| Resin 1a | Loose |
| Resin 1b | Loose |
| Resin 1c | Fused |
| Resin 2a | Loose |
| Resin 2b | Loose |
| Resin 2c | Loose |
| Resin 2d | Loose |
| Resin 2e | Loose |
| Resin 2f | Loose |
| Resin 3a | Loose |
| Resin 3b | Loose |
| Resin 4a | Loose |
| Resin 4b | Loose |

While several aspects of the present disclosure have been described and depicted herein, alternative aspects may be effected by those skilled in the art to accomplish the same objectives. Accordingly, it is intended by the appended claims to cover all such alternative aspects as fall within the true spirit and scope of the disclosure.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. A method of curing a polysilazane fiber comprising:
   a) forming a polysilazane fiber by:
      i. reacting at least one methylchlorodisilane; at least one organochlorosilane comprising at least one alkenyl group; and at least one nitrogen-containing additive to form a resin;
      ii. combining the resin with at least one free-radical generator and optionally at least one inhibitor to form a resin mixture; and
      iii. spinning said resin mixture to form said polysilazane fiber, wherein said spinning is performed at a temperature below the 1 hr, half-life temperature of the free radical generator;

b) exposing said polysilazane fiber to moisture; and c) curing said polysilazane fiber by exposing said polysilazane fiber to a temperature above the 1 hr half-life temperature of the free radical generator but below the softening point temperature of the moisture-exposed polysilazane fiber.

2. The method according to claim 1, wherein said free radical generator is selected from a peroxide, a peroxycarbonate, a peroxysiloxane, and an azo-containing compound.

3. The method according to claim 2, wherein said free radical generator is a peroxide.

4. The method according to claim 1, wherein said at least one alkenyl group is selected from vinyl, allyl, acrylate, methacrylate, vinylether, or styryl.

5. The method according to claim 4, wherein said at least one alkenyl group is vinyl.

6. The method according to claim 1, wherein said organochlorosilane is of formula wherein $R^a$ is selected from hydrogen, $(C_1-C_{12})$alkyl, phenyl, vinyl, allyl, acrylate, and methacrylate, or a combination thereof; and $R^b$ is selected from chlorine, hydrogen, $(C_1-C_{12})$alkyl, phenyl, vinyl, allyl, acrylate, and methacrylate, or a combination thereof.

7. The method according to claim 6, wherein $R^a$ is selected from $(C_1-C_4)$alkyl, phenyl, vinyl, allyl, acrylate, methylacrylate, and vinylbenzyl.

8. The method according to claim 6, wherein $R^b$ is selected from chlorine, $(C_1-C_4)$alkyl, phenyl, vinyl, allyl, acrylate, methylacrylate, and vinylbenzyl.

9. The method according to claim 1, wherein said exposing said polysilazane fiber to moisture is performed at a temperature between 20° C. and 250° C.

10. The method according to claim 1, wherein said curing of said polysilazane fiber occurs at a temperature between 160° C. and 200° C.

11. The method according to claim 1, wherein said polysilazane fiber is a polydisilazane fiber.

12. A method of preparing a silicon carbide fiber, comprising:

a) forming a polydisilazane resin comprising reacting at least one methylchlorodisilane; at least one organochlorosilane comprising at least one alkenyl group; and at least one nitrogen-containing additive to form a resin;

b) combining the resin with at least one free-radical generator and optionally at least one inhibitor to form a resin mixture;

C) spinning said resin mixture to form a polysilazane fiber, wherein said spinning is performed at a temperature below the 1 hr half-life temperature of the free radical generator;

d) exposing said polysilazane fiber to moisture;

e) curing said polysilazane fiber by exposing said polysilazane fiber to a temperature above the 1 hr half-life temperature of the free radical but below the softening point temperature of the moisture-exposed polysilazane fiber to form a cured polysilazane fiber; and f) heating said cured polysilazane fiber.

* * * * *